US008687670B2

(12) United States Patent
Ly-Gagnon et al.

(10) Patent No.: US 8,687,670 B2
(45) Date of Patent: Apr. 1, 2014

(54) PAGING CHANNEL PREDICTION FOR BLUETOOTH PAGING PROCEDURE

(75) Inventors: Yann Ly-Gagnon, San Jose, CA (US); Paul J. Husted, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 378 days.

(21) Appl. No.: 13/116,942

(22) Filed: May 26, 2011

(65) Prior Publication Data

US 2012/0300812 A1 Nov. 29, 2012

(51) Int. Cl.
*H04B 1/69* (2011.01)

(52) U.S. Cl.
USPC ........... 375/132; 375/133; 375/134; 375/135; 375/146

(58) Field of Classification Search
USPC .................................. 375/132, 134, 135, 146
See application file for complete search history.

(56) References Cited

U.S. PATENT DOCUMENTS

| 7,027,418 | B2 * | 4/2006 | Gan et al. ........................ 370/329 |
| 7,245,649 | B2 * | 7/2007 | Haartsen ....................... 375/132 |
| 2007/0066338 | A1 | 3/2007 | Lee et al. |
| 2011/0045771 | A1 * | 2/2011 | Sen et al. ..................... 455/41.2 |

OTHER PUBLICATIONS

International Search Report and Written Opinion—PCT/US2011/046902—ISA/EPO—Dec. 12, 2011.
"PCT Application No. PCT/US11/46902 International Preliminary Report on Patentability", May 24, 2013 , 4 pages.

* cited by examiner

*Primary Examiner* — Qutbuddin Ghulamali
(74) *Attorney, Agent, or Firm* — DeLizio Gilliam, PLLC (57) ABSTRACT

A Bluetooth paging procedure can implement a mechanism for predicting a Bluetooth paging channel in a paging channel hopping sequence. One or more Bluetooth paging channels, on which one or more page requests intended for a Bluetooth device were received, are determined from a plurality of Bluetooth communication channels. One of a plurality of paging channel hopping sequences associated with the Bluetooth device that comprises each of the one or more determined Bluetooth paging channels is identified. A time delay associated with determining a target Bluetooth paging channel from the plurality of Bluetooth communication channels on which to transmit a page response is determined. The target Bluetooth paging channel is determined based, at least in part, on the identified one of the plurality of the paging channel hopping sequences and the time delay.

20 Claims, 4 Drawing Sheets

PAGING CHANNEL PREDICTION FOR BLUETOOTH PAGING PROCEDURE

BACKGROUND

Embodiments of the inventive subject matter generally relate to the field of wireless communication networks and, more particularly, to paging channel prediction for Bluetooth paging procedure.

The Bluetooth® wireless communication standard is typically employed for exchanging communications between fixed or mobile Bluetooth-enabled devices over short distances. Bluetooth devices execute inquiry scan procedures to discover slave Bluetooth devices or to be discovered by a master Bluetooth device. After the discovery process, the Bluetooth devices execute a paging scan procedure to establish a Bluetooth connection for exchanging communications.

SUMMARY

Various embodiments for predicting a control channel in a control channel hopping sequence (e.g., a Bluetooth paging channel hopping sequence) are disclosed. In one embodiment, one or more control channels, on which one or more control packets intended for a communication device were detected, are determined from a plurality of communication channels associated with the communication device. A first of a plurality of predetermined control channel hopping sequences associated with the communication device is identified that comprises each of the one or more control channels on which the one or more control packets were detected. A time delay associated with determining a target control channel from the plurality of communication channels associated with the communication device on which to transmit a response control packet associated with the detected one or more control packets is determined. The target control channel is determined based, at least in part, on the first of the plurality of the predetermined control channel hopping sequences and the time delay. The response control packet is then transmitted via the target control channel.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

The description that follows includes exemplary systems, methods, techniques, instruction sequences, and computer program products that embody techniques of the present inventive subject matter. However, it is understood that the described embodiments may be practiced without these specific details. For instance, although examples refer to predicting a target Bluetooth control channel via which to transmit a Bluetooth control packet based on a sequence of two or more previously detected Bluetooth control channels, embodiments are not so limited. In other embodiments, the target Bluetooth control channel can be predicted based on a single previously detected Bluetooth control channel. In other instances, well-known instruction instances, protocols, structures, and techniques have not been shown in detail in order not to obfuscate the description.

During a Bluetooth inquiry procedure, a master Bluetooth device can discover a slave Bluetooth device with which to establish a Bluetooth communication link. During a subsequent Bluetooth paging procedure, the master Bluetooth device attempts to establish the Bluetooth communication link with the slave Bluetooth device by repeatedly transmitting page requests on a subset of Bluetooth communication channels ("Bluetooth control channels") identified in a paging channel hopping sequence known to both the master Bluetooth device and the slave Bluetooth device. The slave Bluetooth device typically listens for page requests (from the master Bluetooth device) for 11.25 milliseconds every 1.28 seconds. In other words, the slave Bluetooth device may switch from a low power state to an active power state to listen for page requests for 11.25 milliseconds every 1.28 seconds. Furthermore, if the slave Bluetooth device is collocated with another wireless communication device (e.g., a collocated wireless local area network (WLAN) device), the slave Bluetooth device may require control of the communication medium for 11.25 milliseconds every 1.28 seconds, precluding the WLAN device from exchanging WLAN packets when the Bluetooth device is in control of the communication medium. This can result in a loss of performance and throughput at the WLAN device.

In some implementations, one or more processing components (e.g., the link controller, the Bluetooth transceiver, etc.) of the slave Bluetooth device may be switched off in an effort to conserve power when the slave Bluetooth device does not have control of the communication medium (or when the slave Bluetooth device is not actively transmitting/receiving Bluetooth packets). Typically, the slave Bluetooth device detects a page request on one Bluetooth control channel and switches to another Bluetooth control channel to transmit the page response. The Bluetooth devices usually transmit/listen for messages on a Bluetooth control channel for a short predetermined time interval (e.g., 0.625 microseconds). In other words, in response to detecting the page request on the first Bluetooth control channel, the slave Bluetooth device is typically allocated only 0.625 microseconds to generate and transmit the page response on the second Bluetooth control channel to establish the Bluetooth communication link. Restarting the link controller and/or other inactive processing components when the Bluetooth device is in a low-power or sleep mode can typically require a longer time (e.g., 2-3 microseconds) as compared to the time for which the master Bluetooth device listens on the second Bluetooth control channel for a page response (e.g., 0.625 microseconds). This can cause the slave Bluetooth device to tune to the second Bluetooth control channel after the master Bluetooth device has hopped to another subsequent Bluetooth control channel. Therefore, the slave Bluetooth device may not be able to transmit the page response, may not establish the Bluetooth communication link with the master Bluetooth device, and may have to wait a relatively long time before receiving another page request. This can also limit the amount of time that the Bluetooth device can be powered down, which may minimize the efficacy of switching off one or more processing components of the Bluetooth device.

Functionality can be implemented to reduce the time associated with executing the paging procedure and to reduce power consumption at the Bluetooth device. In some embodiments, the page requests intended for the Bluetooth device can be detected on one or more Bluetooth control channels. An predefined paging channel hopping sequence that comprises the detected one or more Bluetooth control channels can be identified. A target Bluetooth control channel to which the master Bluetooth device is expected to tune after an estimated time delay can also be predicted from the paging channel hopping sequence. The time delay may be calculated based, at least in part, on the amount of time the Bluetooth processing units take to switch from the low power mode to the active power mode. The target Bluetooth control channel also represents the Bluetooth control channel via which the Bluetooth device can transmit the page response (after switching to the active power mode). After determining the target Bluetooth control channel, the power mode of the inactive Bluetooth processing units can be switched from a low power mode to the active power mode. The Bluetooth device can then tune to the target Bluetooth control channel and can transmit the page response when the master Bluetooth device is listening on the target Bluetooth control channel. Such a mechanism for predicting the target Bluetooth control channel on which to transmit the page response can reduce the amount of time needed to execute the paging procedure, which can improve the performance of the Bluetooth device. Furthermore, the mechanism for predicting the target Bluetooth control channel can reduce the power consumption of the Bluetooth device.

Figure 1:
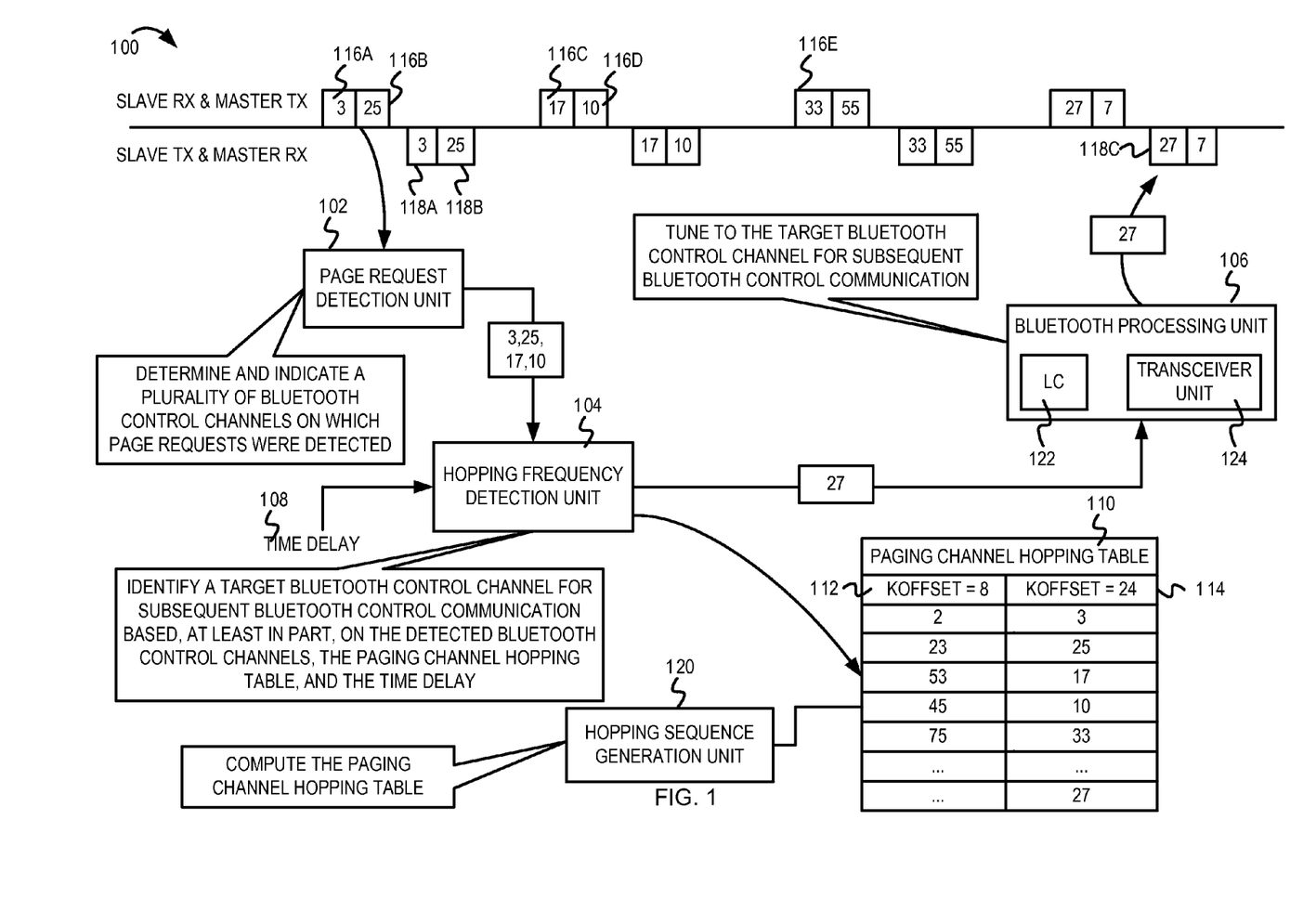
FIG. 1 is an example conceptual diagram illustrating one embodiment of a mechanism for predicting a Bluetooth control channel for a Bluetooth paging procedure.

FIG. 1 is an example conceptual diagram illustrating one embodiment of a mechanism for predicting a Bluetooth control channel for a Bluetooth paging procedure. FIG. 1 depicts a Bluetooth device 100 comprising a page request detection unit 102, a hopping frequency detection unit 104, a Bluetooth processing unit 106, and a hopping sequence generation unit 120. The Bluetooth processing unit 106 comprises a link controller (LC) 122 and a transceiver unit 124. In one implementation, the Bluetooth device 100 can be part of a multi-radio communication device that comprises one or more other collocated communication devices. For example, the multi-radio communication device can comprise the Bluetooth device 100 collocated with a WLAN device. In one implementation, the Bluetooth device and the WLAN device can be embodied on distinct integrated circuits (e.g., distinct Bluetooth and WLAN chips) on a common circuit board (or on separate circuit boards in close proximity) within the multi-radio communication device. In other implementations, the Bluetooth device and the WLAN device can be embodied on a single integrated circuit (e.g., a system on a chip (SoC)) within the multi-radio communication device. The multi-radio communication device may be included within various types of electronic devices with wireless communication capabilities (e.g., mobile phones, notebook computer, tablet computers, gaming consoles, personal computers, etc.). As will be described below, the hopping frequency detection unit 104 in conjunction with the page request detection unit 102 can identify a target Bluetooth control channel via which the Bluetooth device can transmit a page response.

After the Bluetooth device 100 and the master Bluetooth device (e.g., the Bluetooth device that transmits the page requests) complete the Bluetooth inquiry procedure, the Bluetooth device 100 (and consequently the hopping sequence generation unit 120) is aware of the address (e.g., a Bluetooth device (BD) address) associated with the master Bluetooth device, a koffset value, and a clock value (e.g., CLKE) associated with the master Bluetooth device. The hopping sequence generation unit 120 can generate the sequence of Bluetooth control channels in accordance with which the master Bluetooth device is expected to hop to transmit the page requests and receive the page responses. This generated sequence of Bluetooth control channels is referred to herein as the "paging channel hopping sequence." The hopping sequence generation unit 120 can generate the paging channel hopping sequence based on one or more of the BD address of the master Bluetooth device, the BD address of the slave Bluetooth device 100, the koffset value, and the clock value. Typically, the Bluetooth devices can be configured to implement one of two koffset values and the Bluetooth devices can switch between the two koffset values at regular intervals (e.g., every 1.28 seconds). In one implementation, the hopping sequence generation unit 120 can generate two paging channel hopping sequences—the paging channel hopping sequence 112 generated for a first koffset value (e.g., a koffset value of 8) and the paging channel hopping sequence 114 generated for a second koffset value (e.g., a koffset value of 24). The hopping sequence generation unit 120 also stores the paging channel hopping sequences 112 and 114 in the paging channel hopping table 110. It is noted that in other implementations, the Bluetooth devices may switch between any suitable number of koffset values, and accordingly, the hopping sequence generation unit 120 can generate a corresponding number of paging channel hopping sequences. In some implementations, the hopping sequence generation unit 120 can generate the paging channel hopping sequences 112 and 114 once (e.g., when the Bluetooth device 100 discovers the master Bluetooth device with which to establish the Bluetooth communication link). However, in another implementation, the hopping sequence generation unit 120 may generate the paging channel hopping sequences 112 and 114 at periodic intervals.

The page request detection unit 102 can determine and indicate a plurality of Bluetooth control channels on which page requests intended for the Bluetooth device 100 were detected. In one implementation, if the Bluetooth device is in the low power mode, the page request detection unit 102 can determine the plurality of Bluetooth control channels on which page requests intended for the Bluetooth device 100 were detected based, at least in part, on analyzing frequency domain samples of incoming RF signals. In another implementation, the page request detection unit 102 can determine the plurality of Bluetooth control channels on which page requests intended for the Bluetooth device 100 were detected using other page request detection techniques when the Bluetooth device 100 is in the active power mode. In another implementation, the page request detection unit 102 can employ a combination of the above-mentioned page request detection techniques when the Bluetooth device 100 is either in the low power mode or the active power mode. FIG. 1 depicts one example of a series of Bluetooth control channels on which the Bluetooth device 100 and the master Bluetooth device can exchange page requests and page responses. The Bluetooth devices are configured to transmit and receive Bluetooth messages during periodically alternating time intervals (also known as time slots). In one implementation, the master Bluetooth device transmits two page requests on two different Bluetooth control channels during alternating time slots. In the example shown in FIG. 1, the master Bluetooth device transmits the page requests on Bluetooth control channel 3 and Bluetooth control channel 25 (represented by reference numerals 116A and 116B respectively). During this time slot, the page request detection unit 102 can detect the page requests on the Bluetooth control channels 116A and 116B and can determine that the received page requests are intended for the Bluetooth device 100. The page request detection unit 102 can store information associated with the Bluetooth control channels 116A and 116B. During the next consecutive time slot, the master Bluetooth device can switch to a receive mode and can wait to receive a page response on Bluetooth control channel 3 and Bluetooth control channel 25 (represented by reference numerals 118A and 118B). Because the master Bluetooth device does not receive the page response, the master Bluetooth device transmits (during the next time slot) page requests on the Bluetooth control channels 17 and 10 (represented by reference numerals 116C and 116D). During this time slot, the page request detection unit 102 can detect the page requests on the Bluetooth control channels 116C and 116D and can determine that the received page requests are intended for the Bluetooth device 100. The page request detection unit 102 can store information associated with the Bluetooth control channels 116C and 116D.

In one implementation, after the page requests are detected on a predetermined number of Bluetooth control channels (e.g., four Bluetooth control channels in FIG. 1), the page request detection unit 102 provides the information associated with the Bluetooth control channels 116A, 116B, 116C, and 116D to the hopping frequency detection unit 104. As part of the information associated with the detected Bluetooth control channels, the page request detection unit 102 can provide a channel number associated with the Bluetooth control channels 116A, 116B, 116C, and 116D, a time instant at which the page request was detected on each of the Bluetooth control channels 116A, 116B, 116C, and 116D, an order in which the Bluetooth control channels 116A, 116B, 116C, and 116D were detected, and/or other related information. In one implementation, the page request detection unit 102 can provide the information associated with the Bluetooth control channels 116A, 116B, 116C, and 116D detected during a predetermined time interval to the hopping frequency detection unit 104. For example, the page request detection unit 102 may temporarily store the information associated with each Bluetooth control channel on which the page request was detected. After the predetermined time interval elapses, the page request detection unit 102 can transmit a message comprising the information associated with all the Bluetooth control channels (within the predetermined time interval) on which the page requests were detected to the hopping frequency detection unit 104. In another implementation, the page request detection unit 102 can wait to receive a predetermined number of page requests on a corresponding predetermined number of Bluetooth control channels. For example, the page request detection unit 102 may be configured to transmit a message comprising the information associated with four successively detected Bluetooth control channels to the hopping frequency detection unit 104. In another implementation, the page request detection unit 102 can transmit information associated with the Bluetooth control channel as soon as a page request is detected on the Bluetooth control channel. The hopping frequency detection unit 104 can then identify the target Bluetooth control channel based on the information associated with the predetermined number of Bluetooth control channels.

The hopping frequency detection unit 104 can identify a target Bluetooth control channel for subsequent Bluetooth control communication based, at least in part, on the paging channel hopping table 110 and a time delay 108. In response to receiving the information associated with the plurality of detected Bluetooth control channels 116A, 116B, 116C, and 116D, the hopping frequency detection unit 104 can access the paging channel hopping table 110. The hopping frequency detection unit 104 can compare the channel numbers associated with the detected Bluetooth control channels 116A, 116B, 116C, and 116D against the paging channel hopping sequences 112 and 114. In one example, the hopping frequency detection unit 104 can comprise a correlator that correlates the channel numbers associated with the detected Bluetooth control channels 116A, 116B, 116C, and 116D against the paging channel hopping sequences 112 and 114 to identify the paging channel hopping sequence that should be employed by the Bluetooth device 100. In the example of FIG. 1, the hopping frequency detection unit 104 determines that the Bluetooth control channels 116A, 116B, 116C, and 116D were identified in the paging channel hopping sequence 112. Therefore, the hopping frequency detection unit 104 determines that the target Bluetooth control channel should be identified from the paging channel hopping sequence 112. The hopping frequency detection unit 104 can, based on results of the correlation, determine an index (e.g., a position in the identified paging channel hopping sequence 112) associated with the previously detected Bluetooth control channels 116A, 116B, 116C, and 116D, and predict a current Bluetooth control channel in the paging channel hopping sequence 112. For example, the hopping frequency detection unit 104 can determine that the master Bluetooth device may be currently transmitting a page request on the Bluetooth control channel 33 (identified by the reference numeral 116E) based on determining that the Bluetooth control channel 116E follows the Bluetooth control channels 116A, 116B, 116C, and 116D in the paging channel hopping sequence 112.

To determine the Bluetooth control channel on which the Bluetooth device can transmit the page response to the master Bluetooth device (i.e., the target Bluetooth control channel), the hopping frequency detection unit 104 can estimate the maximum time delay 108 between detecting the page requests and transmitting the page response. The time delay 108 can include an elapsed processing time between the hopping frequency detection unit 104 receiving the information associated with the detected Bluetooth control channels 116A, 116B, 116C, and 116D and determining the target Bluetooth control channel. The time delay 108 can also take into consideration the elapsed time between the page request detection unit 102 detecting the page request on the Bluetooth control channels 116A, 116B, 116C, and 116D and the hopping frequency detection unit 104 receiving the information associated with the Bluetooth control channels. Furthermore, as described above, the Bluetooth processing units 106 including the link controller 122 and the Bluetooth transceiver unit 124 may be switched off to conserve power. The time delay 108 can also take into consideration the amount of time that may be needed for the Bluetooth processing units 106 to switch to the active power mode and to generate an appropriate page response. Additionally, the time delay 108 can also factor in the time that may be needed for the hopping frequency detection unit 104 to communicate the target Bluetooth control channel to the Bluetooth processing unit 106. In some implementations, a buffer time interval can be incorporated in the time delay 108 to generate a conservative estimate of the time delay 108 and to help ensure that the Bluetooth device 100 does not miss the target Bluetooth control channel due to unforeseen delays. In one implementation, as depicted in FIG. 1, the hopping frequency detection unit 104 can receive a pre-computed time delay 108 as an input. In some implementations, the hopping frequency detection unit 104 can calculate the time delay 108 based on the various factors described above (e.g., the elapsed processing time, the time elapsed when switching from the low power mode to the active power mode, etc.). The hopping frequency detection unit 104 can then identify the target Bluetooth control channel based on the information associated with the Bluetooth control channels 116A, 116B, 116C, and 116D (e.g., the time instant at which the paging packets were detected on the Bluetooth control channels), the current Bluetooth control channel 116E, the paging channel hopping sequence 112, and the time delay 108. In the example shown in FIG. 1, the hopping frequency detection unit 104 may determine that Bluetooth control channel 27 (identified by the reference numeral 118C) is the target Bluetooth control channel.

In one implementation, the hopping frequency detection unit 104 can write the identified paging channel hopping sequence 112 into a predetermined memory location (e.g., in hardware or in software) and indicate an index associated with the target Bluetooth control channel 118C. Once the Bluetooth processing unit 106 is ready to transmit the page response, the Bluetooth processing unit 106 (e.g., the link controller 122) can access a predetermined memory location to determine the paging channel hopping sequence 112 and can identify the target Bluetooth control channel (e.g., based on the index provided by the hopping frequency detection unit 104). In another implementation, the hopping frequency detection unit 104 can provide an indication of the selected paging channel hopping sequence 112 and the index (in the paging channel hopping sequence 112) associated with the target Bluetooth control channel 118C to the Bluetooth processing unit 106. After the hopping frequency detection unit 104 determines the target Bluetooth control channel 118C, the Bluetooth processing units 106, including the link controller 122 and the Bluetooth transceiver 124, can be powered on (or can switch from the low power mode to the active power mode). In one example, the hopping frequency detection unit 104 can provide a trigger to the link controller 122, the transceiver unit 124, and other components of the Bluetooth processing unit 106 to cause the components of the Bluetooth processing unit 106 to switch from the low power mode to the active power mode. In some implementations, the hopping frequency detection unit 104 can provide a single notification to the Bluetooth processing unit 106 to cause the Bluetooth processing unit 106 to switch to the active power mode, to indicate the paging channel hopping sequence 112, and to indicate the target Bluetooth control channel 118C. In another implementation, the hopping frequency detection unit 104 can send multiple notifications—a first notification to cause the Bluetooth processing unit 104 to switch to the active power mode and a second notification to indicate the paging channel hopping sequence 112 and the target Bluetooth control channel 118C. After determining the paging channel hopping sequence 112 and the target Bluetooth control channel 118C, the Bluetooth device can implement various techniques to respond to the page requests transmitted by the master Bluetooth device. In one implementation, the Bluetooth processing unit 106 can tune to the target Bluetooth control channel 118C and can transmit the page response on the target Bluetooth control channel 118C.

Figure 2:
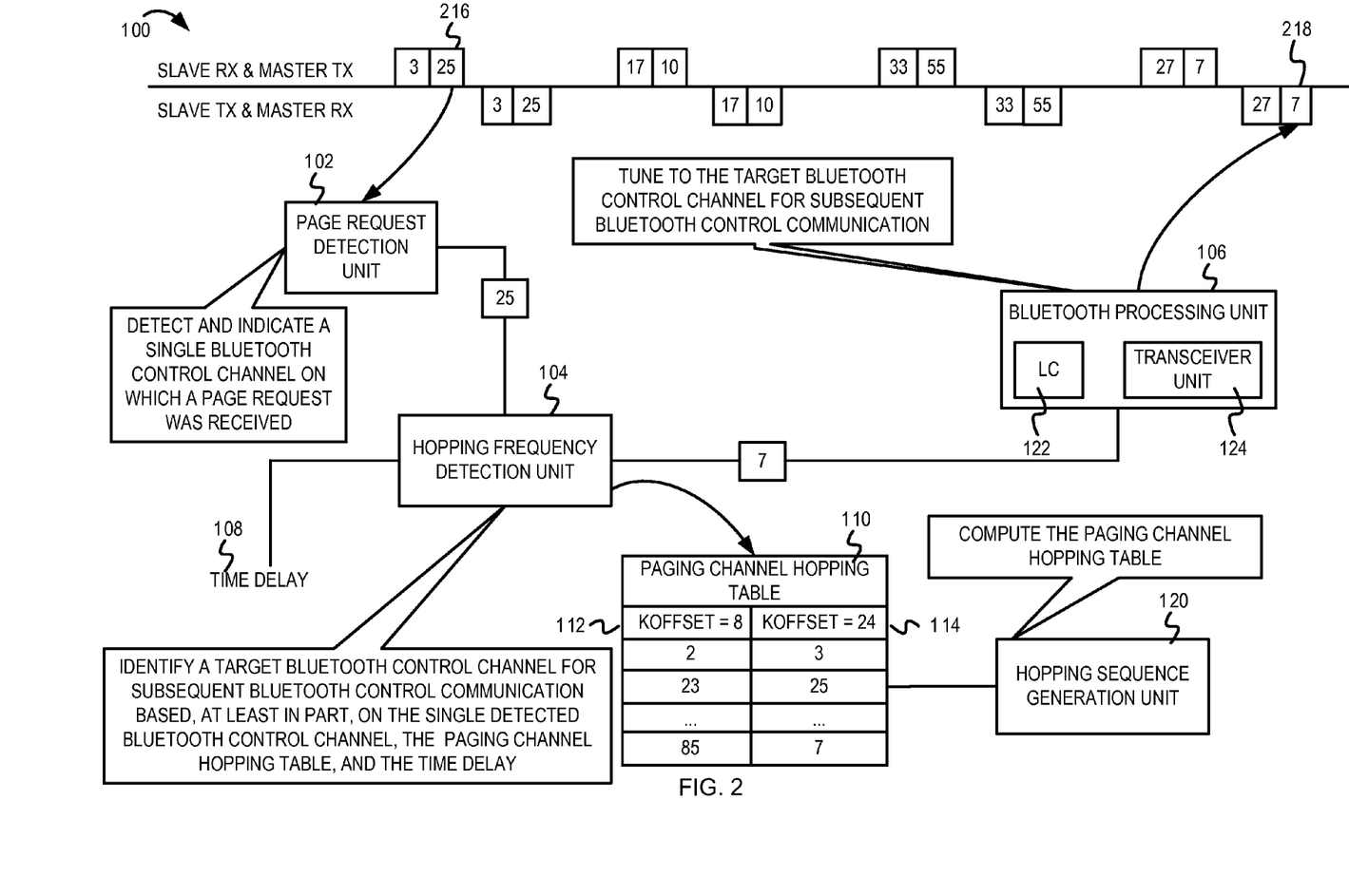
FIG. 2 is an example conceptual diagram illustrating a second embodiment of a mechanism for predicting a Bluetooth control channel for a Bluetooth paging procedure.

FIG. 2 is an example conceptual diagram illustrating a second embodiment of a mechanism for predicting a Bluetooth control channel for a Bluetooth paging procedure. FIG. 2 depicts the Bluetooth device 100 of FIG. 1 comprising the page request detection unit 102, the hopping frequency detection unit 104, the Bluetooth processing unit 106, and the hopping sequence generation unit 120. The Bluetooth processing unit 106 comprises the link controller (LC) 122 and the transceiver unit 124. As will be described below, in some embodiments, the hopping frequency detection unit 104 in conjunction with the page request detection unit 102 can identify the target Bluetooth control channel based on information associated with a single Bluetooth control channel on which a page request was detected.

As described above, the hopping sequence generation unit 120 can generate the paging channel hopping sequences 112 and 114 based on an address associated with a master Bluetooth device, a koffset value, a clock value (e.g., CLKE) associated with the master Bluetooth device, and an address associated with the Bluetooth device 100. In the example of FIG. 2, the hopping sequence generation unit 120 generates the paging channel hopping sequence 112 for a first koffset value (e.g., a koffset value of 8) and the paging channel hopping sequence 114 for a second koffset value (e.g., a koffset value of 24), and stores the paging channel hopping sequences 112 and 114 in the paging channel hopping table 110. In some implementations, the hopping sequence generation unit 120 can generate the paging channel hopping sequences 112 and 114 once (e.g., either at start-up or when a new connection between the Bluetooth device 100 and the master Bluetooth device is established). In other implementations, the hopping sequence generation unit 120 can recalculate the paging channel hopping sequences 112 and 114 periodically. The hopping sequence generation unit 120 may store the paging channel hopping sequences 112 and 114 at a predetermined hardware (or software) memory location.

The page request detection unit 102 can determine and indicate a single Bluetooth control channel on which a page request intended for the Bluetooth device was detected (e.g., similarly as was described above with reference to FIG. 1). In the example shown in FIG. 2, the page request detection unit 102 may determine that the page request was detected on Bluetooth channel 25 (identified by the reference numeral 216). The page request detection unit 102 can provide the channel number associated with the detected Bluetooth control channel 216, a time instant at which the page request was detected on the Bluetooth control channel 216, and/or other information associated with the Bluetooth control channel 216 to the hopping frequency detection unit 104.

The hopping frequency detector 104 can identify a target Bluetooth control channel for subsequent Bluetooth control communication based, at least in part, on the single detected Bluetooth control channel 216, the paging channel hopping table 110, and the time delay 108 In some implementations, in response to receiving the information associated with the single detected Bluetooth control channel 216, the hopping frequency detection unit 104 can compare the channel number associated with the detected Bluetooth control channel 216 against the paging channel hopping sequences 112 and 114 in the paging channel hopping table 110. In the example of FIG. 2, the hopping frequency detection unit 104 determines that the paging channel hopping sequence 112 comprises the detected Bluetooth control channel 216. Consequently, the hopping frequency detection unit 104 can use the paging channel hopping sequence 112 to determine the target Bluetooth control channel. The hopping frequency detection unit 104 can determine the target Bluetooth control channel based on the time delay 108, the information associated with the detected Bluetooth control channel 216, and the paging channel hopping sequence 112. As described above with reference to FIG. 1, the time delay 108 can be determined based on a variety of factors, such as the elapsed processing time for the hopping frequency detection unit 104 to determine the target Bluetooth control channel, the elapsed time for the Bluetooth processing units 106 to switch to the active power mode, etc. Additionally, the hopping frequency detection unit 104 may either use a pre-computed time delay 108 or calculate the time delay 108 on the fly to determine the target Bluetooth control channel. In the example of FIG. 2, the hopping frequency detection unit 104 determines that Bluetooth control channel 7 (depicted by the reference numeral 218) is the target Bluetooth control channel.

The hopping frequency detection unit 104 can then notify the Bluetooth processing unit 106 of the identified paging channel hopping sequence 112 and the target Bluetooth control channel 218. In one implementation, the hopping frequency detection unit 104 can write the identified paging channel hopping sequence 112 and the target Bluetooth control channel 218 into a predetermined memory location. The hopping frequency detection unit 104 can then provide a trigger signal to the Bluetooth processing unit 106 to switch the power mode of the link controller 122, the transceiver unit 124, and/or other processing components from the low power mode to the active power mode. In response to receiving the trigger signal, the link controller 122 can switch to the active power mode and can read the predetermined memory location to determine the target Bluetooth control channel 218. In some implementations, the hopping frequency detection unit 104 can provide (to the Bluetooth processing unit 106) the paging channel hopping sequence 112 and the target Bluetooth control channel 218 as part of the trigger signal, or in a separate notification signal. After the link controller 122 and the other Bluetooth processing units 106 switch to the active power mode, the link controller 122 can generate the appropriate page response (e.g., the link controller 122 may use a previously stored page response) for transmission on the target Bluetooth communication channel 218. The link controller 122 can then tune to the target Bluetooth control channel 218 and can cause the transceiver unit 124 to transmit the page response on the target Bluetooth control channel.

Figure 3:
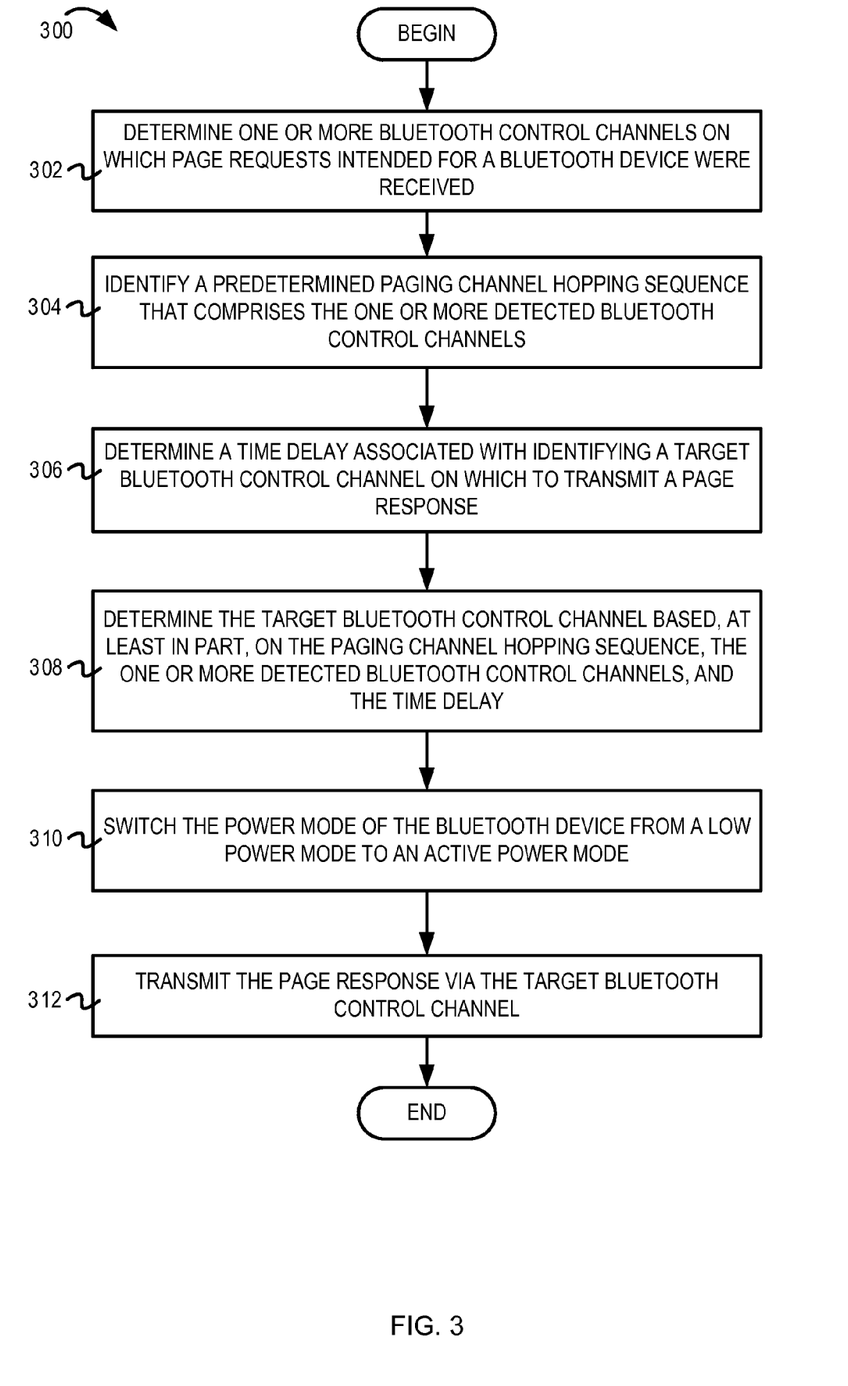
FIG. 3 is a flow diagram illustrating example operations for predicting a Bluetooth control channel for a Bluetooth paging procedure.

FIG. 3 is a flow diagram ("flow") 300 illustrating example operations for predicting a Bluetooth control channel for a Bluetooth paging procedure. The flow 300 begins at block 302.

At block 302, one or more Bluetooth control channels are determined on which page requests intended for a Bluetooth device were received. In some implementations (as described in FIG. 1), the page request detection unit 102 can determine a plurality of Bluetooth control channels 116A, 116B, 116C, and 116D on which page requests intended for the Bluetooth device 100 were received. As described above, the page request detection unit 102 can determine the plurality of Bluetooth control channels 116A, 116B, 116C, and 116D based, at least in part, on analyzing frequency domain samples of incoming RF signals and/or other suitable page request detection techniques. The page request detection unit 102 can be configured to determine the plurality of Bluetooth control channels 116A, 116B, 116C, and 116D when the Bluetooth device 100 is operating in the low power mode or in the active power mode. The page request detection unit 102 can provide information (e.g., a channel number, a timestamp, etc.) associated with the plurality of Bluetooth control channels 116A, 116B, 116C, and 116D to the hopping frequency detection unit 104. Providing the information associated with a plurality of Bluetooth control channels 116A, 116B, 116C, and 116D can minimize the uncertainty associated with determining the target Bluetooth control channel, can minimize the effect of a false page request detection, and can minimize the effect of blocking devices. In other implementations (as described in FIG. 2), the page request detection unit 102 can provide the information associated with a single Bluetooth control channel 216 on which a page request intended for the Bluetooth device 100 was last detected. This can minimize the amount of time associated with determining the target Bluetooth control channel and transmitting the response on the target Bluetooth control channel. The flow continues at block 304.

At block 304, a predetermined paging channel hopping sequence that comprises the one or more detected Bluetooth control channels is identified. For example, the hopping frequency detector 104 can identify the predetermined paging channel hopping sequence that comprises the one or more Bluetooth control channels (determined at block 302). In one implementation (as described in FIG. 1), the hopping frequency detection unit 104 can correlate a plurality of Bluetooth control channels 116A, 116B, 116C, and 116D against the paging channel hopping sequences 112 and 114 in the paging channel hopping table 110 to determine which of the paging channel hopping sequences comprises the Bluetooth control channels. In another implementation, as described in FIG. 2, the hopping frequency detector 104 can compare the channel number associated with the single detected Bluetooth control channel 216 against the paging channel hopping sequences 112 and 114 to determine which of the paging channel hopping sequences comprises the channel number associated with the detected Bluetooth control channel 216. The flow continues at block 306.

At block 306, a time delay associated with identifying the target Bluetooth control channel on which to transmit a page response is determined. The hopping frequency detection unit 104 can either receive a pre-computed value of the time delay 108 or can calculate the time delay 108. As described above, the time delay 108 can be computed based on one or more of the following: 1) the elapsed processing time between the page request detection unit 102 detecting the one or more Bluetooth control channels and the hopping frequency detection unit 104 receiving the information associated with the one or more Bluetooth control channels, 2) the elapsed processing time between the hopping frequency detection unit 104 receiving the information associated with the one or more Bluetooth control channels and determining the target Bluetooth control channel, 3) the elapsed processing time between the hopping frequency detection unit 104 determining the target Bluetooth control channel and communicating the target Bluetooth control channel to the Bluetooth processing unit 106, 4) the elapsed time for the Bluetooth processing units 106 to switch to the active power mode and be prepared to transmit the page response, and/or 5) a buffer time interval. The flow continues at block 308.

At block 308, the target Bluetooth control channel is identified based, at least in part, on the paging channel hopping sequence, the one or more detected Bluetooth control channels, and the time delay. For example, based on the time instants at which the paging requests were detected on the Bluetooth control channels 116A, 116B, 116C, and 116D, the predetermined paging channel hopping sequence 112, and time delay 108, the hopping frequency detection unit 104 can select Bluetooth control channel 118C as the target Bluetooth control channel. In one implementation, the hopping frequency detection unit 104 can determine an index in the paging channel hopping sequence 112 associated with the last detected Bluetooth control channel 116D and can (based on the time delay 108) select the target Bluetooth control channel 118C. As described above in FIGS. 1 and 2, the hopping frequency detection unit 104 can store the identified paging channel hopping sequence 112 and an index associated with the target Bluetooth control channel 118C at a predetermined memory location (e.g., in hardware or in software). The flow continues at block 310.

At block 310, the power mode of the Bluetooth device is switched from a low power mode to an active power mode.

For example, the hopping frequency detector 104 can generate a trigger signal to switch the power mode of the link controller 122, the Bluetooth transceiver unit 124, and other components of the Bluetooth processing unit 106 from the low power mode to the active power mode. In some implementations, in response to detecting the trigger signal, the link controller 122 can switch to the active power mode and read the predetermined memory location to determine the paging channel hopping sequence 112 and the target Bluetooth control channel. The flow continues at block 312.

At block 312, the page response is transmitted via the target Bluetooth control channel. For example, the link controller 122 can tune appropriate components of the Bluetooth processing unit 106 to the target Bluetooth control channel and can cause the Bluetooth transceiver unit 124 to transmit the page response on the target Bluetooth control channel. From block 312, the flow ends.

It should be understood that FIGS. 1-3 are examples meant to aid in understanding embodiments and should not be used to limit embodiments or limit scope of the claims. Embodiments may comprise additional circuit components, different circuit components, and/or may perform additional operations, fewer operations, operations in a different order, operations in parallel, and some operations differently. For example, although not depicted in FIGS. 1-3, in some implementations, the hopping frequency detection unit 104 can also predict a current Bluetooth control channel in the paging channel hopping sequence 112 based on the one or more previously detected Bluetooth control channels. The hopping frequency detection unit 104 can then determine the target Bluetooth control channel based on the current Bluetooth control channel, the time delay 108, and the identified paging channel hopping sequence 112. With reference to the example of FIG. 1, after the hopping frequency detection unit 104 determines that the paging channel hopping sequence 112 comprises the plurality of detected Bluetooth control channels 116A, 116B, 116C, and 116D, the hopping frequency detection unit 104 can determine that the Bluetooth control channel 116E is the current Bluetooth control channel. Furthermore, although FIG. 1 depicts the hopping frequency detection unit 104 determining the current Bluetooth control channel 116E prior to determining the target Bluetooth control channel 118C, embodiments are not so limited. In other embodiments, the hopping frequency detection unit 104 may not determine the current Bluetooth control channel (as depicted in FIGS. 2-3). Instead, the hopping frequency detection unit 104 can directly predict the target Bluetooth control channel 118C based on the time instants at which the plurality of Bluetooth control channels 116A, 116B, 116C, and 116D were detected, the time delay 108, and the paging channel hopping sequence 112.

Although FIGS. 1-3 describe the hopping frequency detection unit 104 determining and indicating the target Bluetooth control channel on which to transmit the page response, embodiments are not so limited. In another implementation, in addition to indicating the target Bluetooth control channel, the hopping frequency detection unit 104 can also indicate a preceding Bluetooth control channel on which the master Bluetooth device is expected to transmit a page request. The Bluetooth processing unit 106 can tune to the preceding Bluetooth control channel and can listen for the page request from the master Bluetooth device. In response to receiving the page request, the Bluetooth processing unit 106 can switch to the target Bluetooth control channel and can transmit the page response via the target Bluetooth control channel.

Although FIG. 1 depicts the page request detection unit 102 detecting consecutive Bluetooth control channels on which page requests intended for the Bluetooth device 100 were received, embodiments are not so limited. In some implementations, the page request detection unit 102 may not detect consecutive Bluetooth control channels (e.g., because of blocking devices). For example, in FIG. 1, the page request detection unit 102 may detect page requests on the Bluetooth control channels 116A, 116B, 116D, and 116E (and may not detect the page request on the intermediate Bluetooth control channel 116C). The page request detection unit 102 can provide the information associated with the predetermined number of detected Bluetooth control channels and an order in which the page requests were received on the Bluetooth control channels to the hopping frequency detection unit 104. As described above, hopping frequency detection unit 104 can then correlate the channel numbers associated with the detected Bluetooth control channels to identify the appropriate predetermined paging hopping sequence and the target Bluetooth control channel.

Furthermore, it is noted that in some implementations, the hopping frequency detection unit 104 may be able to identify the predetermined paging hopping sequence even if a subset of the detected Bluetooth control channels are not part of the predetermined paging hopping sequence. With reference to the example of FIG. 1, the hopping frequency detection unit 104 may receive information associated with the Bluetooth control channels 3, 25, 53, and 17. The hopping frequency detection unit 104 can select the predetermined paging hopping sequence 112 based on detecting a high correlation between the Bluetooth control channels 3, 25, 53, and 17 and the predetermined paging hopping sequence 112 (even though the Bluetooth control channel 53 is not part of the predetermined paging hopping sequence 112).

Embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the inventive subject matter may take the form of a computer program product embodied in any tangible medium of expression having computer usable program code embodied in the medium. The described embodiments may be provided as a computer program product, or software, that may include a machine-readable medium having stored thereon instructions, which may be used to program a computer system (or other electronic device(s)) to perform a process according to embodiments, whether presently described or not, since every conceivable variation is not enumerated herein. A machine-readable medium includes any mechanism for storing or transmitting information in a form (e.g., software, processing application) readable by a machine (e.g., a computer). A machine-readable medium may be a machine-readable storage medium, or a machine-readable signal medium. A machine-readable storage medium may include, for example, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of tangible medium suitable for storing electronic instructions. A machine-readable signal medium may include a propagated data signal with computer readable program code embodied therein, for example, an electrical, optical, acoustical, or other form of propagated signal (e.g., carrier waves, infrared signals, digital signals, etc.). Program code embodied on a machine-readable signal medium may be transmitted using any suitable medium, including, but not limited to, wireline, wireless, optical fiber cable, RF, or other communications medium.

Computer program code for carrying out operations of the embodiments may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a personal area network (PAN), or a wide area network (WAN), or the connection may be made to an external computer (for example, through the Internet using an Internet Service Provider).

Figure 4:
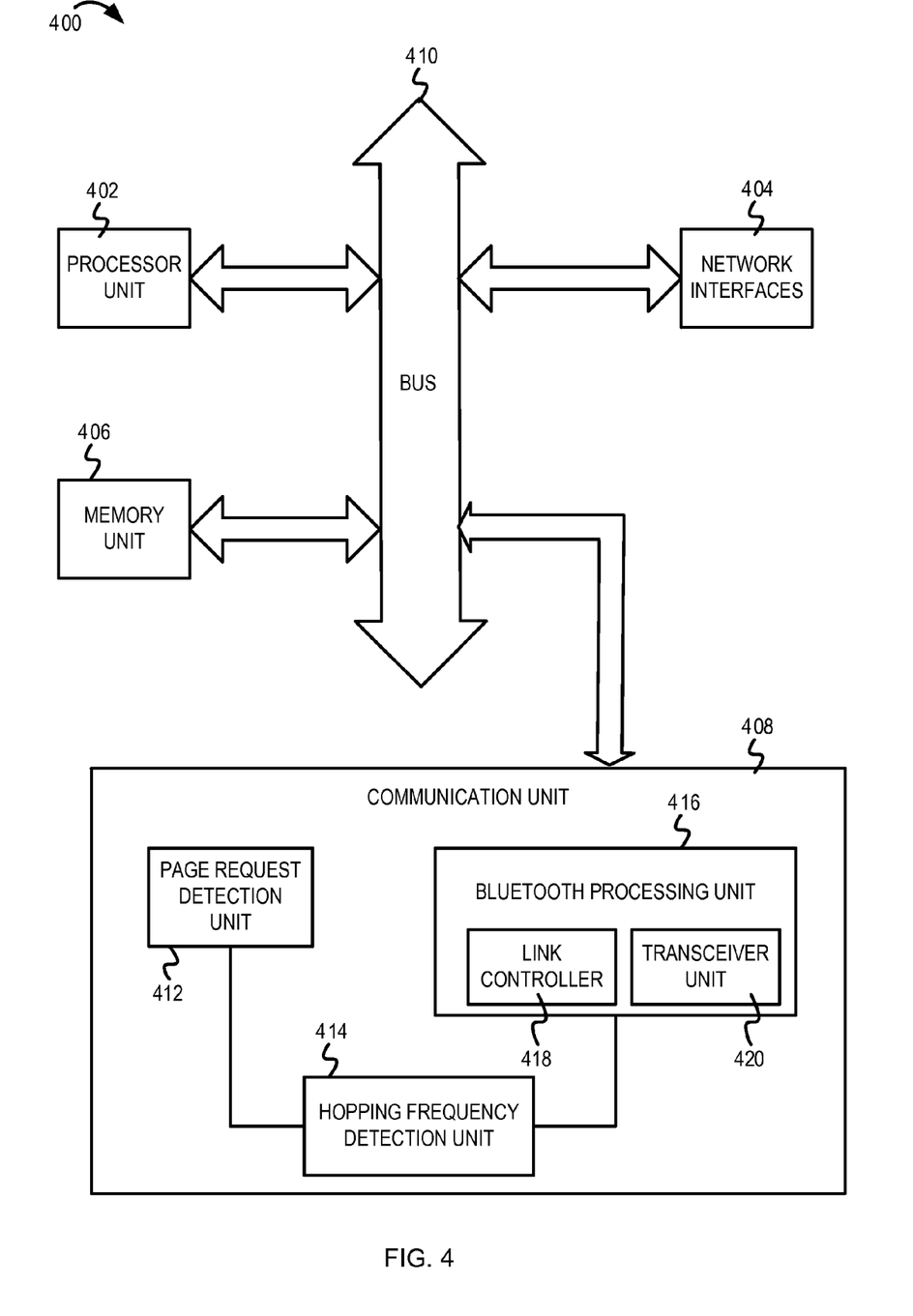
FIG. 4 is a block diagram of one embodiment of a communication device including a mechanism for predicting a Bluetooth control channel for a Bluetooth paging procedure.

FIG. 4 is a block diagram of one embodiment of an electronic device 400 including a mechanism for predicting a Bluetooth control channel for a Bluetooth paging procedure. In some implementations, the electronic device 400 may be one of a personal computer (PC), a notebook computer, a tablet computer, a netbook, a mobile phone, a gaming console, a mobile phone, a personal digital assistant (PDA), a smart appliance, or other electronic devices comprising a collocated WLAN device and a Bluetooth device. In some implementations, the Bluetooth device and the WLAN device can be embodied on distinct integrated circuits (e.g., distinct Bluetooth and WLAN chips) on a common circuit board (or on separate circuit boards in close proximity). In other implementations, the Bluetooth device and the WLAN device can be embodied on a single integrated circuit (e.g., a system on a chip (SoC)). The Bluetooth device and the WLAN device can share one or more processing components (e.g., receiver antenna, analog front end processing units, etc.) of the electronic device 400.

The electronic device 400 includes a processor unit 402 (possibly including multiple processors, multiple cores, multiple nodes, and/or implementing multi-threading, etc.). The electronic device 400 includes a memory unit 406. The memory unit 406 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The electronic device 400 also includes a bus 410 (e.g., PCI, ISA, PCI-Express, HyperTransport®, InfiniBand®, NuBus, AHB, AXI, etc.), and network interfaces 404 that include one or more wireless network interfaces (e.g., a WLAN interface, a Bluetooth® interface, a WiMAX interface, a ZigBee® interface, a Wireless USB interface, etc.) and, in some implementations, a wired network interface (e.g., an ATM interface, an Ethernet interface, a Frame Relay interface, SONET interface, etc.).

The electronic device 400 also comprises a communication unit 408. The communication unit 408 comprises a page request detection unit 412, a hopping frequency detection unit 414, and a Bluetooth processing unit 416. The Bluetooth processing unit 416 comprises a link controller 418 and a transceiver unit 420. As described above with reference to FIGS. 1-3, the communication unit 408 can implement functionality to detect a target Bluetooth control channel on which to transmit a page response to a master Bluetooth device, in response to detecting one or more page requests on corresponding one or more Bluetooth control channels. Any one of these functionalities may be partially (or entirely) implemented in hardware and/or on the processor unit 402. For example, the functionality may be implemented with an application specific integrated circuit, in logic implemented in the processor unit 402, in a co-processor on a peripheral device or card, etc. Further, realizations may include fewer or additional components not illustrated in FIG. 4 (e.g., video cards, audio cards, additional network interfaces, peripheral devices, etc.). The processor unit 402, the memory unit 406, and the network interfaces 406 are coupled to the bus 410. Although illustrated as being coupled to the bus 410, the memory unit 406 may be coupled to the processor unit 402.

While the embodiments are described with reference to various implementations and exploitations, it will be understood that these embodiments are illustrative and that the scope of the inventive subject matter is not limited to them. In general, techniques for paging channel prediction for Bluetooth paging procedure as described herein may be implemented with facilities consistent with any hardware system or hardware systems. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method comprising:
   determining, from a plurality of communication channels associated with a communication device, one or more control channels on which one or more control packets intended for the communication device were detected;
   identifying a first of a plurality of predetermined control channel hopping sequences associated with the communication device that comprises each of the one or more control channels on which the one or more control packets were detected;
   determining a target control channel from the plurality of communication channels associated with the communication device on which to transmit a response control packet associated with the detected one or more control packets based, at least in part, on the first of the plurality of the predetermined control channel hopping sequences and a time delay associated with determining the target control channel; and
   transmitting the response control packet via the target control channel.

2. The method of claim 1, further comprising determining the time delay associated with determining the target control channel, wherein said determining the time delay comprises one or more of:
   calculating a time interval between said determining the one or more control channels on which the one or more control packets intended for the communication device were detected and said determining the target control channel, calculating a time interval associated with one or more processing units of the communication device switching from an inactive power mode to an active power mode, and calculating a time interval associated with communicating an indication of the target control channel to the one or more processing units of the communication device.

3. The method of claim 1, wherein said transmitting the response control packet via the target control channel is in response to detecting the one or more control packets intended for the communication device on the one or more control channels.

4. The method of claim 1, further comprising:
generating a notification to switch one or more processing units associated with the communication device from a low power mode to an active power mode.

5. The method of claim 4, wherein the notification comprises an indication of at least one of the first of the plurality of predetermined control channel hopping sequences and the target control channel.

6. The method of claim 1,
wherein said determining the one or more control channels on which the one or more control packets intended for the communication device were detected comprises:
detecting a plurality of control channels, from the plurality of communication channels associated with the communication device, on which the one or more control packets intended for the communication device were received; and
wherein said identifying the first of the plurality of predetermined control channel hopping sequences associated with the communication device that comprises each of the one or more control channels on which the one or more control packets were detected comprises:
correlating the plurality of control channels against each of the plurality of predetermined control channel hopping sequences;
determining a successful correlation between the plurality of control channels and the first of the plurality of predetermined control channel hopping sequences; and
determining to identify the target control channel from the first of the plurality of predetermined control channel hopping sequences.

7. The method of claim 1,
wherein said determining the one or more control channels on which the one or more control packets intended for the communication device were detected comprises:
detecting a control channel, from the plurality of communication channels associated with the communication device, on which a control packet intended for the communication device was received; and
wherein said identifying the first of the plurality of predetermined control channel hopping sequences associated with the communication device that comprises each of the one or more control channels on which the one or more control packets were detected comprises:
comparing a channel number associated with the control channel against a plurality of channel numbers associated with corresponding each of the plurality of predetermined control channel hopping sequences;
determining that the first of the plurality of predetermined control channel hopping sequences comprises the channel number associated with the control channel; and
determining to identify the target control channel from the first of the plurality of predetermined control channel hopping sequences.

8. The method of claim 1, wherein said determining the target control channel comprises:
determining a current control channel from the plurality of communication channels associated with the communication device, based on the first of the predetermined control channel hopping sequences and the one or more control channels on which the one or more control packets were detected; and
determining the target control channel based on the current control channel and the time delay.

9. The method of claim 1,
wherein said determining the target control channel comprises:
determining an intermediate control channel from the plurality of communication channels on which to receive a control packet intended for the communication device, wherein the intermediate control channel precedes the target control channel; and
wherein said transmitting the response control packet via the target control channel comprises:
tuning the communication device to the intermediate control channel;
detecting a subsequent control packet intended for the communication device on the intermediate control channel;
tuning the communication device to the target control channel; and
transmitting the response control message via the target control channel in response to said detecting the control packet intended for the communication device on the intermediate control channel.

10. The method of claim 1, wherein said determining the one or more control channels on which the one or more control packets intended for the communication device were detected comprises determining a channel number associated with each of the one or more control channels, a time instant at which a corresponding control packet was detected on each of the one or more control channels, and an order in accordance with which the one or more control channels were detected.

11. The method of claim 1, wherein the communication device comprises a Bluetooth device, wherein the target control channel is a paging channel, and wherein the one or more control packets comprise a page request.

12. A communication device comprising:
a control packet detection unit operable to:
determine, from a plurality of communication channels associated with the communication device, one or more control channels on which one or more page requests intended for the communication device were detected;
a frequency hopping detection unit coupled with the control packet detection unit, the frequency hopping detection unit operable to:
identify a first of a plurality of predetermined paging channel hopping sequences associated with the communication device that comprises each of the one or more control channels on which the one or more page requests were detected; and
determine a target control channel from the plurality of communication channels associated with the communication device on which to transmit a page response associated with the detected one or more page requests based, at least in part, on the first of the plurality of the predetermined paging channel hopping sequences and a time delay associated with determining the target control channel.

13. The communication device of claim 12 further comprising:
one or more processing units operable to transmit the page response via the target control channel.

14. The communication device of claim 13, wherein the frequency hopping detection unit is further operable to:
generate a notification to switch the one or more processing units from a low power mode to an active power mode, wherein the notification comprises an indication of at least one of the first of the plurality of predetermined paging channel hopping sequences and the target control channel.

15. The communication device of claim 13,
wherein the frequency hopping detection unit operable to determine the target control channel comprises the frequency hopping detection unit operable to:
determine an intermediate control channel from the plurality of communication channels on which to receive a page request intended for the communication device, wherein the intermediate control channel precedes the target control channel; and
wherein the one or more processing units operable to transmit the page response via the target control channel comprises the one or more processing units operable to:
tune the communication device to the intermediate control channel;
detect a subsequent page request intended for the communication device on the intermediate control channel;
tune the communication device to the target control channel; and
transmit the page response via the target control channel in response to the one or more processing units detecting the page request intended for the communication device on the intermediate control channel.

16. The communication device of claim 12,
wherein the control packet detection unit operable to determine the one or more control channels on which one or more page requests intended for the communication device were detected comprises the control packet detection unit operable to:
detect a plurality of control channels, from the plurality of communication channels, on which the one or more page requests intended for the communication device were received; and
wherein the frequency hopping detection unit operable to identify the first of the plurality of predetermined paging channel hopping sequences associated with the communication device that comprises each of the one or more control channels on which the one or more page requests were detected comprises the frequency hopping detection unit operable to:
correlate the plurality of control channels against each of the plurality of predetermined paging channel hopping sequences;
determine a successful correlation between the plurality of control channels and the first of the plurality of predetermined paging channel hopping sequences; and
determine to identify the target control channel from the first of the plurality of predetermined paging channel hopping sequences.

17. The communication device of claim 12,
wherein the control packet detection unit operable to determine the one or more control channels on which one or more page requests intended for the communication device were detected comprises the control packet detection unit operable to:
detect a control channel, from the plurality of communication channels, on which a page request intended for the communication device was received; and
wherein the frequency hopping detection unit operable to identify the first of the plurality of predetermined paging channel hopping sequences associated with the communication device that comprises each of the one or more control channels on which the one or more page requests were detected comprises the frequency hopping detection unit operable to:
compare a channel number associated with the control channel against a plurality of channel numbers associated with corresponding each of the plurality of predetermined paging channel hopping sequences;
determine that the first of the plurality of predetermined paging channel hopping sequences comprises the channel number associated with the control channel; and
determine to identify the target control channel from the first of the plurality of predetermined paging channel hopping sequences.

18. One or more non-transitory machine-readable storage media having instructions stored therein, which when executed by one or more processors causes the one or more processors to perform operations that comprise:
determining one or more control channels, from a plurality of communication channels associated with a device, on which one or more page requests intended for the device were detected;
identifying a first of a plurality of predetermined paging channel hopping sequences associated with the device that comprises each of the one or more control channels on which the one or more page requests were detected;
determining a target control channel from the plurality of communication channels on which to transmit a page response associated with the detected one or more page requests based, at least in part, on the first of the plurality of the predetermined paging channel hopping sequences and a time delay associated with determining the target control channel; and
transmitting the page response via the target control channel.

19. The non-transitory machine-readable storage media of claim 18,
wherein said operation of determining the one or more control channels on which the one or more page requests intended for the device were detected comprises:
detecting a plurality of control channels, from the plurality of communication channels, on which the one or more page requests intended for the device were received; and
wherein said operation of identifying the first of the plurality of predetermined paging channel hopping sequences associated with the device that comprises each of the one or more control channels on which the one or more page requests were detected comprises:
correlating the plurality of control channels against each of the plurality of predetermined paging channel hopping sequences;

determining a successful correlation between the plurality of control channels and the first of the plurality of predetermined paging channel hopping sequences; and determining to identify the target control channel from the first of the plurality of predetermined paging channel hopping sequences.

20. The non-transitory machine-readable storage media of claim 18, wherein said operation of determining the one or more control channels on which the one or more page requests intended for the device were detected comprises:

detecting a control channel, from the plurality of communication channels, on which a page request intended for the device was received; and wherein said operation of identifying the first of the plurality of predetermined paging channel hopping sequences associated with the device that comprises each of the one or more control channels on which the one or more page requests were detected comprises:

comparing a channel number associated with the control channel against a plurality of channel numbers associated with corresponding each of the plurality of predetermined paging channel hopping sequences;

determining that the first of the plurality of predetermined paging channel hopping sequences comprises the channel number associated with the control channel; and determining to identify the target control channel from the first of the plurality of predetermined paging channel hopping sequences.

\* \* \* \* \*